United States Patent [19]
Merrill et al.

[11] 4,101,423
[45] Jul. 18, 1978

[54] TUBULAR FILTRATION ELEMENT AND METHOD OF MAKING IT

[75] Inventors: Wayne S. Merrill, Nashua, N.H.; James H. Edwards, Winchester; Bernard R. Danti, Lexington, both of Mass.

[73] Assignee: Millipore Corporation, Bedford, Mass.

[21] Appl. No.: 769,763

[22] Filed: Feb. 17, 1977

Related U.S. Application Data

[63] Continuation of Ser. No. 565,094, Apr. 4, 1975, abandoned.

[51] Int. Cl.$^2$ ............... B01D 27/00; B01D 29/06
[52] U.S. Cl. ..................... 210/494 M; 210/497.1; 210/500 M
[58] Field of Search ........... 210/490, 494 M, 500 M, 210/493 B, 506, 507, 489, 497.1, 321 R, 321 AB, 508, 509, 503, 257 M, 416 R, 416 M, 433 M, 493 M; 427/244, 245; 428/36; 156/195, 191, 280; 93/77 CL, 1 E, 36 PC, 80, 94 R; 138/129, 150; 131/12, 267

[56] References Cited

U.S. PATENT DOCUMENTS

| | | | |
|---|---|---|---|
| 3,341,024 | 9/1967 | Lowe et al. | 210/490 |
| 3,376,180 | 4/1968 | Larson et al. | 93/77 CL |
| 3,773,181 | 7/1971 | Calderwood | 210/500 M |

FOREIGN PATENT DOCUMENTS

| | | |
|---|---|---|
| 1,066,480 | 4/1967 | United Kingdom. |
| 1,367,701 | 9/1974 | United Kingdom. |
| 1,263,207 | 2/1972 | United Kingdom. |
| 1,297,794 | 11/1972 | United Kingdom. |
| 965,130 | 7/1964 | United Kingdom. |
| 855,068 | 11/1960 | United Kingdom. |
| 1,345,155 | 1/1974 | United Kingdom. |
| 979,954 | 1/1965 | United Kingdom. |
| 1,149,408 | 4/1969 | United Kingdom. |
| 1,407,298 | 9/1975 | United Kingdom. |

OTHER PUBLICATIONS

Membrane Digest, vol. 1, No. 3, 1972 (Fall), U.S. Dept. of Interior, Office of Saline Water.

*Primary Examiner*—Frank Sever
*Attorney, Agent, or Firm*—Irons and Sears

[57] ABSTRACT

A tubular element for removing particulate matter and bacteria of dimensions in excess of a predetermined value from a fluid flowing from the interior to the exterior of the filtration element has a first inner layer of a highly porous material that has a low coefficient of sliding friction, and a second layer of a microporous filtration material having pores of substantially uniform size. The element may include an outer support layer of a porous material that is not subject to shedding. In a preferred form, the inner layer is formed from a high wet strength paper, the microporous filtration layer has sufficiently small pores to remove all bacteria from the fluid, and the outer layer may be a fine porous plastic sheet material or a high wet strength, high porosity paper that is impregnated with the polymeric material that forms the microporous filtration material. The fine pore structure of the outer layer supports the fragile filtration layer. In a preferred form, both ends of the tubular element are impregnated with a suitable sealing material such as a polyurethane potting compound. The ends are preferably dipped in the sealing material to a predetermined depth. When cured, these end portions provide additional mechanical support for the tube ends and block the passage of particulate matter and bacteria past the filtration layer at its edge. A fabrication process for the filtration element that does not damage the fragile microporous filtration layer involves helically wrapping the inner layer on a fixed mandrel to act as a carrier, and helically wrapping an overlying layer of the microporous filtration material. If an outer layer is used this is wrapped on the microporous material. All layers move in unison along the longitudinal axis of the mandrel. Each layer is self-overlapping and at least the filtration layer is sealed in the area of the overlap.

8 Claims, 6 Drawing Figures

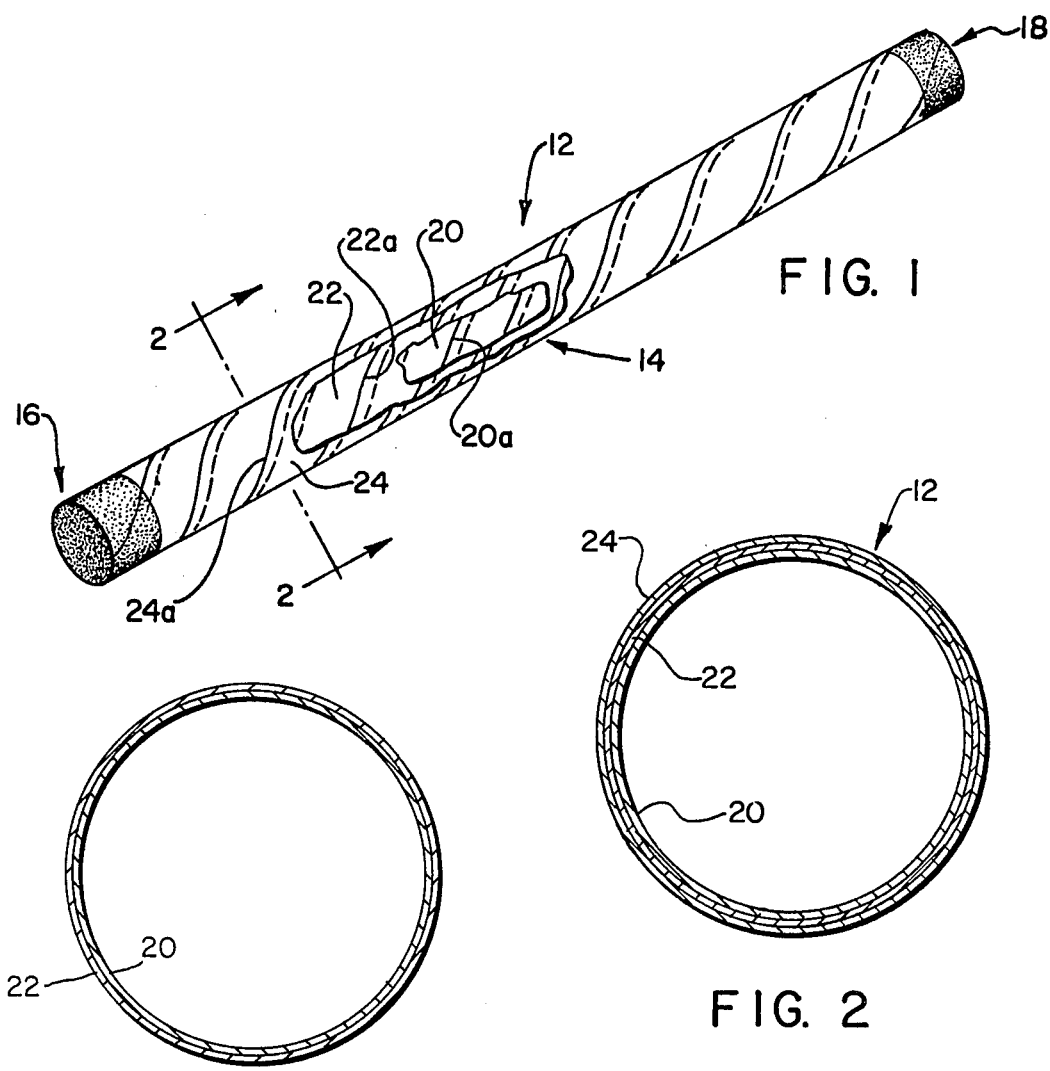
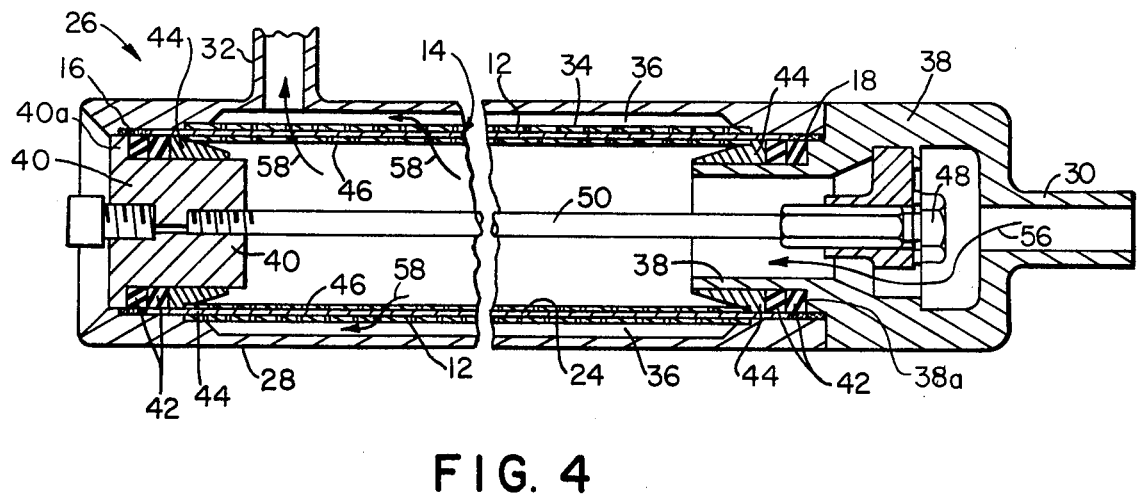

TUBULAR FILTRATION ELEMENT AND METHOD OF MAKING IT

This is a continuation, of application Ser. No. 565,094, filed Apr. 4, 1975, now abandoned.

BACKGROUND OF THE INVENTION

This invention relates in general to filters and methods for manufacturing filters, and more specifically to tubular microporous filtration elements operating with a forced inside-to-outside fluid flow.

Although filter media have been formed from a wide variety of materials, including paper, woven fabrics, and beds of fine granular materials such as sand or charcoal, it is convenient to classify filter media as either depth filters or screen filters. The terms "depth" and "screen" describe the mechanisms by which each of these types of filter media retain particles and remove them from the fluid passing through the media. A fibrous depth filter, such as an automobile oil filter, has a porous structure defined by a random array of fibers that are intertwined and interconnected. The spaces between the fibers form tortuous flow passages of variable size in which the particles become trapped as the fluid flows through. Because of the inherent variability and randomness of the pore size and structure, depth filters retain particles having a wide range of sizes, while allowing a certain percentage of particles of all sizes to pass through the filter media.

In contrast, screen or absolute filters remove particles from the fluid primarily by a sieving mechanism at the upstream surface of the filter. A screen filter is a porous matrix having a precisely defined pore size. A window screen is a common example of what has come to be called an absolute filter. With such a filter, the filtration is "absolute" since any particles larger than the hole size are retained on the filter surface. Thus the pore size of a screen filter establishes a cut-off on the size of the particulate matter found suspended in the filtered fluid. It should be noted, however, that if the particulate matter is deformable, as for example bacteria, then the relationship between the pore size and the size of the particles screened by the filter is somewhat more complex. As used herein, the term "filtration" will refer to the action of a screen or absolute filter and may be defined as the removal of particles or bacteria from a fluid that are larger than the pore size of the filter material.

Besides differing in their retention efficiency, that is, the ability of the filter media to remove particles of varying size from the fluid, depth and screen filters also differ in their capacity to hold particles. Depth filters generally have a higher particle holding capacity since they retain particles both on their surface and within the pores themselves. Thus the dirt-holding capacity of a depth filter for a given size of particles will depend on such factors as the thickness of the filter media and the density of the filter media and hence its pore size distribution. Screen filters generally have a lower particle holding capacity since they retain particles only on the upstream filter surface. When this upstream surface becomes plugged by the retained, filtered particles, it becomes ineffective as a filtering element and must be replaced.

In many applications, it is necessary to totally remove particles having dimensions in the submicrometer range. For this purpose it is well known in the art to use a thin polymer layer that is rendered highly porous with a highly uniform pore size. Such layers are commonly termed microporous filtration materials or membranes.

One characteristic of such microporous filtration materials is that they are extremely fragile and easily rupture when subjected to deformation due to rough handling, bending or fluid pressure. Since even the most minute crack or break will destroy their effectiveness, it is necessary to use extreme care in their manufacture and use. Another characteristic of microporous membrane materials is that most of such materials expand by about six percent when wet. This characteristic is commonly termed "wet growth". These materials also exhibit a significant degree of sliding friction.

Microporous filtration materials find many uses in industry, science and education. A common industrial application is the "cold" sterilization of pharmaceuticals and the stabilization of alcoholic beverages. In cold sterilization, the filtration material has a sufficiently small pore size to block the passage of all bacteria present in the unfiltered fluid supplied to the upstream side. In the production of alcoholic beverages, the removal of bacteria yeast and molds stabilizes and clarifies the beverage. In the production of many pharmaceutical products, the removal of bacteria is an essential step for obvious health reasons.

To be commercially practical, the microporous filtration material must process a large volume of a fluid in a reasonably short period of time. It is therefore standard practice to apply a positive pressure to the unfiltered fluid which forces the fluid through the filtration material at an acceptable rate, particularly when filtered particles accumulate or "cake" on the upstream surface.

In addition to a high production rate, it is of great importance to be able to test the integrity of the filtration system before and after a production run. Without such a test capability, for example, a batch of an antibiotic valued at tens of thousands of dollars could be run through a defective or improperly installed filtration element before the defect is detected through a test of the end product. An important advantage of microporous filtration material is that their integrity can be readily checked both before and after a production run by a "bubble point" test. To perform the test, the filtration layer is wet with a liquid which is then removed from the upstream surface of the layer only. The region above the filter media is filled with a regulated pressure gas such as air or nitrogen. The pressure is gradually increased until bubbles of the gas appear in the downstream liquid. The pressure at which the bubbles first begin to appear is commonly termed the "bubble point". At the bubble point the pressure of the gas exceeds the capillary attraction for the liquid held in the pores of the filtration layer and is therefore a direct measurement of the effective diameter of the pores and thus their filtration efficiency and integrity. If the filtration layer is broken, even microscopically, or if the filtration layer is improperly installed, bubbles will appear immediately at the point of the break or leak since there is no capillary resistance to the gas flow. A porous material having extremely large pores and a negligible flow resistance will have a zero bubble point.

Microporous filtration media are most commonly used in the form of discs. Because of the fragility of the filtration material and the desirabilit of operating the filtration process with an applied pressure, the discs are usually used in conjunction with a support screen and holder commonly termed a "pie plate". To increase the effective filtration surface and thereby accommodate larger volumes of raw fluid and increase the operational life of the filtration system, it is well known in the art to utilize a large number of discs (frequently in excess of 60) and their associated support structures arranged in a stack. Although a filtration system of this type has proven to be highly successful, it has a serious drawback in that it usually requires two to three hours of careful work to assemble such a stack, particularly when all of the elements must be maintained in a sterile condition.

It has been found that a more convenient arrangement is to form the filtration layer into a tubular structure which can be quickly inserted into a suitable housing for directing the fluid flow radially through the walls of the tube. Besides avoiding the laborious stack assembly, the tubular configuration also has the advantage of presenting a relatively large surface area to the input fluid which results in an increased production rate and a prolonged operational life for the filtration media.

Tubular constructions of this type are known both in the field of microfiltration and in conventional depth filter systems such as reverse osmosis filter membranes commonly used in water desalinization and fluid concentration processes. Representative reverse osmosis filter elements and systems are described in U.S. Pat. No. 3,578,175 to Manjikian, and U.S. Pat. No. 3,715,036 to Hamer. The reverse osmosis filter, however, is not effective for filtration, especially microfiltration to achieve cold sterilization. First, it does not totally remove particles above a given size. Second, it suffers from media migration, that is, the constituent material of the filter breaks off, or sheds, and therefore contributes particulate contamination to the filtrate. Third, it is susceptible to the release of retained particles under "shock", a sudden change or reversal in the fluid pressure of the system due, for example, to valving.

Tubular microporous filtration elements heretofore known in the art are characterized by a perforated support tube fabricated from a structural material such as metal which is wrapped with an overlying support layer of a material such as woven nylon fabric, a layer of the microporous filtration material, and an outer protective layer of a porous material such as the nylon fabric. The structure is adapted to an outside-to-inside fluid flow with the perforated metal tube providing mechanical support for the filtration layer. The nylon support layer avoids the cost and technical difficulty of machining or etching a suitable number of extremely small diameter perforations in the support tube. This construction also reduces the potential for damage to the fragile filtration layer during manufacture since it is wrapped directly onto the nylon-lined core.

The tubular filtration elements of this prior construction are replaceably mounted in a suitable housing that directs the fluid in an outside-to-inside flow direction. A clamp acting through an O-ring positioned inside the filtration element secures the element to a surrounding portion of the housing. The reliability of this mounting system depends on the skill of the user in properly positioning and clamping the filtration element.

Although the tubular filtration element is significantly more convenient to use than the stacked disc system, it nevertheless has certain shortcomings. First, conventional tubular filtration elements are not "inline" steam-sterilizable, that is, sterilizable by the passage of pressurized steam (typically at temperatures in excess of 121° C and pressures in excess of 15 psi) through the production apparatus including the filtration unit. The pressurized steam causes an outward expansion of the filtration layer due to wet growth. Since the fluid flow direction and the pressure differential are outside-to-inside, the wet growth results in the formation of wrinkles in the filtration media. Each wrinkle is a weakened stress area within the filtration layer which is highly susceptible to rupture. Since inline sterilization is not feasible, the filtration unit must be disassembled, autoclaved, and reassembled under aseptic conditions prior to each production run. This procedure is time consuming, costly, and increases the likelihood of inadvertant bacterial contamination.

To avoid the wrinkling problem and achieve an inline sterilization capability, it is desirable to utilize an inside-to-outside flow direction. This arrangement, however, presents the problem of providing the proper downstream support for the filtration layer. The downstream support must be mechanically strong while having a high degree of porosity, have a small pore structure to prevent the protrusion of the filter layer into the pores, and not suffer from media migration or otherwise contribute particulate contamination to the filtered fluid. An inside-to-outside flow direction also raises a manufacturing problem since there is no perforated core of structural material on which to form the filtration layer. The filtration media must therefore be wrapped into a tubular form on a suitable cylindrical object such as a mandrel and removed from the mandrel. The relatively high sliding friction of the filtration material, however, prevents the sliding disengagement of the mandrel and the fragile filtration layer without the use of sufficient force to break or weaken the layer.

It is therefore a principal object of this invention to provide a tubular filtration element that reliably removes particulate matter and bacteria in excess of a predetermined size from a fluid flowing from the inside to the outside of the filtration element and is in-line steam sterilizable.

A further object of the invention is to provide a tubular filtration element having the advantages described above which is conveniently loaded and unloaded in a filtration system.

Yet another object of the invention is to provide a tubular filtration element which does not develop stress areas during operation that are susceptible to rupture and therefore has a high degree of reliability and a long operational life.

Still another object of the invention is to provide a tubular filtration element which is mechanically strong, has a relatively low flow resistance, does not shed particulate contaminants into the filtered fluid, and may be tested as to its integrity both before and after use.

Still another object of this invention is to provide a tubular filtration element which meets government regulations for the processing of food and drugs and has a relatively low cost of manufacture.

Another object of this invention is to provide a method for continuously and rapidly fabricating helically wrapped tubular filtration elements embodying the features and advantages of the invention without rupturing or weakening the fragile microporous filtration material.

SUMMARY OF THE INVENTION

Broadly speaking, the tubular filtration element of this invention has a laminate construction of a first inner layer of a high porosity, low-friction material, and a second layer of a microporous filtration material. The filtration element may include an outer layer of a porous material having a fine pore structure that provides good support for the filtration layer and is not subject to shedding. The element is operated with an inside-to-outside pressurized fluid flow. In a preferred form, the first inner layer is a high wet strength paper, the second layer is a filtration material of a sterilizing grade, and the outer layer is a porous sheet of expanded polyethylene. The porosity of the inner and outer layers is sufficiently great that they do not significantly affect the bubble point of the filtration layer. The layers are helically wrapped in an overlying relationship on a fixed mandrel with each layer being self-overlapping. The layers advance in unison along the mandrel as they are wrapped so that there is no relative motion between adjacent layers. An adhesive material that blocks the passage of the particulate matter and bacteria being filtered seals the second filtration layer in the region of overlap. The ends of the tubular laminate construction are impregnated over a predetermined length adjacent each edge of the construction with a suitable sealing adhesive material such as a polyurethane potting compound. When the adhesive material cures, the end portions provide mechanical support for the tube while blocking the passage of the fluid or the particulate and bacterial contaminants.

These and other features and objects of the invention will be more fully understood from the following detailed description which should be read in conjunction with the drawings.

BRIEF DESCRIPTION OF THE DRAWINGS

FIG. 1 is a perspective view of a preferred embodiment of a tubular filtration element constructed according to the invention;

FIG. 2 is a sectional view taken along the line 2—2 of FIG. 1;

FIG. 3 is a sectional view of an alternative embodiment of the invention having two layers;

FIG. 4 is a highly simplified view in vertical section of a filtration system utilizing a disposable filtration element of the type shown in FIG. 1;

DETAILED DESCRIPTION OF THE PREFERRED EMBODIMENT

Figure 5:
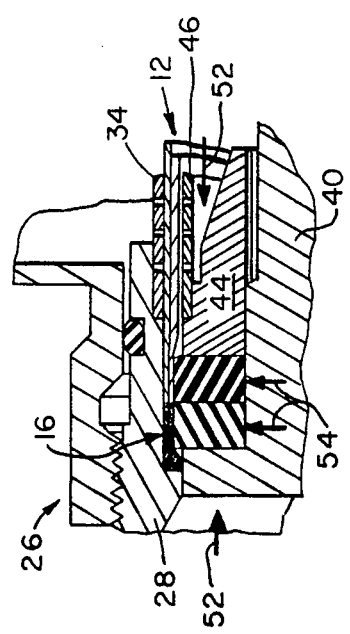
FIG. 5 is an enlarged view in vertical section of the mounting arrangement shown in FIG. 4 which includes details that are omitted from FIG. 4 for reasons of clarity.

FIG. 1 illustrates a tubular filtration element 12 having a central body portion 14 and impregnated end portions 16 and 18. The central body or wall portion 14 has a laminate construction, as best shown in FIG. 2, consisting of a first inner layer 20, an overlying second filtration layer 22, and an overlying outer layer 24. Each layer is helically wrapped and self-overlapping, in regions of overlap 20a, 22a, or 24a associated with the layers 20, 22 and 24, respectively. At least the filtration layer 22 is sealed in its region of overlap 22a. The tubular configuration provides a relatively large filtration surface in a compact form.

The inner layer 20 which supplies the basic structural strength of the filter element is fabricated from a material that is highly porous, has a low coefficient of sliding friction, and has a high wet strength. A preferred material is a high wet strength paper such as that supplied by C. H. Dexter & Co., of Windsor Locks, Conn., under the designation C-1140. Preferably the inner layer has a zero bubble point and therefore does not interfere with the bubble point of the layer 22. Because the layer 20 is a depth filter media, it achieves some pre-filtration of a fluid passing through the filtration element in an inside-to-outside flow direction.

The high wet strength of the inner layer 20 ensures that it will not disintegrate in the presence of the fluid. This would eliminate both the pre-filtration and mechanical support of the inner layer. The support of the inner layer becomes particularly significant when a back pressure forces the layers 22 and 24 inwardly against the inner layer. The low sliding friction characteristic of the inner layer relates to its function as a carrier layer in the manufacturing process, which is discussed in greater detail hereinbelow. In addition to having all of these characteristics, this paper also has the advantages of being approved by Federal regulations for the processing of food and drugs and may be sealed to itself in the overlapping region 20a with a standard thermo-plastic adhesive such as that supplied by Custom Coating and Laminating, Inc., of Worcester, Mass., under their designation No. 1089, which adhesive also complies with applicable U.S. food and drug regulations.

The second filtration layer 22 is formed from a thin sheet of microporous filtration material. Preferably the filtration material is a sterilizable grade having a uniform pore size of 0.22 microns. Typical filtration materials made of mixed esters of cellulose of this grade are approximately 80% porous, have a bubble point of approximately 55 psi, are autoclavable, and have a water flow rate of approximately 16 milliliters per minute per square centimeter of filtration area, at 25° C. with a differential pressure of 10 psi. A typical thickness for such a sheet is 150 to 200 microns. When properly supported, this grade of filtration material can withstand significantly higher pressure differentials. Although a pore size of 0.22 microns is recommended, smaller pore sizes will also sterilize the fluid being filtered but with correspondingly higher applied pressure differentials and reduced flow rates. Larger pore sizes are increasingly likely to pass bacteria and therefore are recommended only for non-sterilizing applications such as the purification of wash liquids for micro-miniature circuits. As is characteristic of polymeric microporous filtration materials, the second layer 22 exhibits a high degree of fragility, sliding friction, and a wet growth of approximately 6%.

The outer layer 24 is formed from a porous material that has a sufficiently fine pore structure to support the intermediate layer 22 without weakening or rupturing the layer 22 due to a protrusion of the layer 22 into the pores or holes of the layer 24. The layer 24 must also be non-shedding or, in other words, totally free of media migration which would contribute particulate matter to the filtrate. As with the inner layer 20, the outer layer 24 must exhibit a high wet strength since in normal operation it provides mechanical support for the layers 20 and 22. Preferably it has a low bubble point that does not interfere with the bubble point of the filtration layer 22. A layer of this construction not only provides support for the filtration layer 22, but also permits lateral flow. This in turn permits the entire area of the intermediate filter layer to be effective, rather than only the portion facing the openings in the outer support screen. Therefore, the total throughput of the disposable unit is increased. Although it is possible to use a wrapping or "sock" of woven nylon or polypropylene as employed in conventional filtration tubes, for reasons of both cost and effectiveness, the layer 24 is preferably formed from a fine porous plastic sheet material, and in particular a nonwoven, expanded high density polyethylene mesh material such as that supplied by Hercules, Inc., of Wilmington, Delaware, under the trademark designation Delnet type DL-50.

The expanded polyethylene mesh material preferably forming the layer 24 has an embossed pattern of aligned ribs that are interconnected by thinner, transversely oriented filaments. Moreover, these ribs and filaments define a pattern of highly uniform holes preferably having a maximum dimension in the range of 15 to 20 thousandths of an inch. Such materials are highly porous while providing the desired support for the filtration layer 22 under applied pressure of up to 100 psi. Such materials are also strong when wet and do not exhibit shedding. In addition, when overlapped on itself, the contiguous layers form a mechanical bond through an interlocking of the embossed patterns.

Another material that may be used for the outer layer 24 is a high wet strength, high porosity paper that is impregnated with a cured polymeric compound or lacquer of the type used in forming the microporous filtration layer 22. It has been found that this material may exhibit an unacceptable degree of media migration when used in sterilizing applications, and particularly during in-line steam sterilization used in conjunction with such applications. For this reason, the preferred construction is the expanded high density polyethylene described above.

U.S. Pat. No. 2,926,104 to Goetz describes a process for manufacturing a lacquer-impregnated paper having the uniform porosity characteristics of an absolute filtration media and an unusually high structural strength resulting from the action of the cured lacquer in binding the paper fibers. Beside providing a relatively strong layer with good flow distribution characteristics, this binding also diminishes the breaking off or shedding of the paper fibers which causes media migration. Although the desired effect can be achieved with a variety of porous, fibrous materials, the outer layer 24 may be manufactured from a very porous, high wet strength paper such as normally used in the manufacture of teabags such as the paper designated Dexter C-1140 used to form the inner layer 20. This paper exhibits extreme porosity, excellent strength when wet by hot liquids, is readily available, and has a relatively low cost. The lacquer impregnated in the paper is preferably of a grade which, when cured to render it porous, produces a pore size of approximately 5 to 10 microns. It should be noted that the impregnation of a microporous filtration lacquer in the paper results in some loss of porosity which can raise the bubble point of the outer layer 24 from 0 psi to as much as 5 psi. To lower the bubble point, an adhesive used to secure the overlapping portion 24a may be applied intermittently to create unsealed gaps that offer an extremely low resistance path to the flow of the test gas, without adversely affecting the other functions of this layer.

The ends 16 and 18 of the filtration element 12 are sealed with a suitable sealant to provide additional mechanical support to the tubular configuration and to prevent the passage of unfiltered fluid or bacterial contaminants past the "free" end of the microporous filtration layer 22. The sealing material must also block the passage of contaminants of the size being filtered by the layer 22. Suitable materials are silicone resins, but for reasons which will be discussed below, a preferred material is a polyurethane potting compound such as that sold by Hughson Chemicals, Lord Corporation, of Erie, Pa., identified by them as TS-1525-32.

Although the preferred form of the invention utilizes three layers 20, 22 and 24, the filtration element may have only two layers, the inner support and carrier layer 20 and the filtration layer 22, as illustrated in FIG. 3. The composition, characteristics and function of the layers 20 and 22 is the same in this embodiment as they are in the three layer embodiment illustrated in FIGS. 1 and 2. However, when the two layer embodiment is used, it is necessary to provide a suitable mechanical downstream support for the layer 22. Such a support may take the form of a tube of a structural material rendered porous by a large number of holes each with a diameter in the range of 0.010 inch. In addition, the interior surface of the support member is preferably coated with a suitable low-friction material, such as that sold by E. I. DuPont de Nemours Corporation, under the trademark designation Teflon, to facilitate the sliding insertion and removal of the filtration element. This arrangement, however, is significantly more costly to produce than the three layer embodiment particularly since the formation of the holes in the support member requires an expensive photoetching process.

FIG. 4 illustrates the tubular filtration element 12 of FIGS. 1 and 2 in operation in a filtration system 26 of the type described more fully in the commonly assigned, co-pending U.S. application Ser. No. 565,095 filed of even date herewith by Edwards et al. for "Filtration System", the disclosure of which is incorporated herein by reference. The system 26 consists essentially of a housing 28 having an inlet passage 30 and an outlet passage 32. A perforated support member or screen 34 is mounted within the housing with an annular clearance 36 between the exterior surface of the screen 34 and the interior surface of the housing 28. The disposable tubular filtration element 12 is positioned immediately inside the screen 34 with the outer layer 24 adjacent the screen 34. There is a slight clearance 36 between the outer surface of the element 12 and the inner surface of the screen when the filtration element is dry. This clearance facilitates the sliding insertion of the element without abrading or otherwise damaging any of the component layers. In operation, however, the wet growth of the layers 22 and 20 and the outwardly directed pressure of the fluid flow forces the central portion 14 of the element 12 against the screen 34. To provide the necessary mechanical support for the portion 14, particularly when the system is operating under applied pressures of up to 100 psi, the screen 34 is manufactured from a structural material such as stainless steel. In addition, the screen 34 has a large number of perforations of sufficiently small size to provide good support for the layers 20, 22 and 24 without appreciably increasing the flow resistance. Holes etched, punched or machined by standard techniques and having a diameter of approximately 1/32 inch have been found suitable.

The filtration element 12 is supported and sealed within the housing 28 by an assembly having upstream and downstream fluid guides 38 and 40, respectively, each of which carries on its outer surface a pair of resilient members 42. The resilient members are held between a flange 38a or 40a formed on the flow guides 38 and 40, respectively, and an inner screen support member 44 having a generally ring-shaped configuration. The inner screen supports 44 mount an inner screen 46 that is similar in shape and construction to the outer screen 34 except that it is positioned interior to the disposable filtration element 12. The inner screen 46 offers a certain degree of mechanical support to the filtration element both during the insertion of the filtration element into the system 26 and during operation in the event of a back-pressure. The screen 46 also performs a certain degree of pre-filtration for the layers 20, 22 and 24 and also serves as a support screen for a pre-filter, if used.

To firmly mount and seal the filtration element in the system while establishing the desired inside-to-outside fluid flow, the flow guides 38 and 40 are drawn longitudinally towards one another by tightening a nut 48 threaded on a center rod 50 that is secured to the downstream flow guide 40 and journaled in the upstream flow guide 38. Since the inner screen 46 prevents the inner screen supports 44 from moving towards one another, the movement of the flow guides generates a longitudinal compression on the resilient members 42, as indicated by the arrows 52 in FIG. 5. In response to this compressive force, the resilient members 42 deform in an outwardly radial direction against the surrounding housing 28 as indicated by the arrows 54 (FIG. 5). This radial movement firmly seals the end portion 16 of the interposed filtration element 12 as shown. A similar action between the fluid guide 38 and upstream support member 44 simultaneously seals the upstream end 18 of the filtration element. It should be noted that although the inner screen 46 prevents the movement of the members 44 towards one another, this function could be performed by alternative structures such as rods or a tube with large openings. These structures, of course, do not offer the support and pre-filtration advantages of a screen.

Preferably the length of the end portions 16 and 18 are selected so that one of the resilient members 42 bears on the impregnated end portion 16 or 18, whereas the adjacent member 42 bears on the central portion 14 of the element 12 that is adjacent the end portion. This arrangement provides a more effective seal than a single, uniform resilient member since it automatically compensates for different compression characteristics of the portions 14 and 16 or 18. This arrangement also has the advantage of reducing the stress on the fragile filtration layer 22 at the interface between the portions 14 and 16.

When the outer layer 24 is formed from an expanded plastic mesh, it has been found that the level of radial sealing force of the resilient members necessary to block a fluid flow laterally through the layer 24 to the junction with the end portion 16 or 18 is likely to rupture the fragile filtration layer 22. Because of this, the sealing material used to form the ends 16 and 18 must be hydrophilic when cured. (If the sealant rendered the filter adjacent to it hydrophobic, the filter would not be wetted and would not then offer capillary resistance to the bubble point test gas, therefore the bubble point could not be used as an indication of filter integrity). The polyurethane potting compound identified above is a preferred sealing material since it is hydrophilic, whereas the silicone resin materials are hydrophobic when cured. It has also been found that the expanded plastic mesh material in the end portions 16 and 18 may be adhered to the layer 22 by applying acetone or suitable solvent over a region of the plastic mesh material adjacent the ends of the element as it is wrapped. This softens the underlying filter layer 22 and the plastic material mechanically locks to the layer 22.

It will be understood that if the outer layer 24 is formed from a lacquer impregnated paper, the resilient members can safely apply a sealing force sufficient to block the fluid from the end portions 16 and 18, so that a hydrophobic sealing material may be used.

When the tubular filtration element is thus sealed, unfiltered fluid entering the system 26 through the inlet 30 passes through appropriate openings in the upstream fluid guide 38 as indicated by the arrow 56 and is directed to the interior of the tubular filtration element 12. The only fluid flow path from the interior of the element 12 is outwardly through the layers 20, 22 and 24 and the perforations in the outer screen 34 as indicated by the arrows 58. The filtered fluid in the region 36, then flows to the outlet 32.

It should be noted that the materials forming the filtration element 12, except for the plastic mesh material which may form the outer layer 24, are paper. As a result, they react similarly to wetting and pressure, and the composite layers of the filtration element move substantially in unison during operation or in-line steam sterilization. In addition, the wet growth expansion of the layers is in the same direction as the forced inside-to-outside fluid flow through the filtration element. Our invention therefore avoids the wrinkling and stress problems associated with prior filtration elements designed for an outside-to-inside fluid flow, against the direction of expansion of at least some of the layers of the filtration element.

Figure 6:
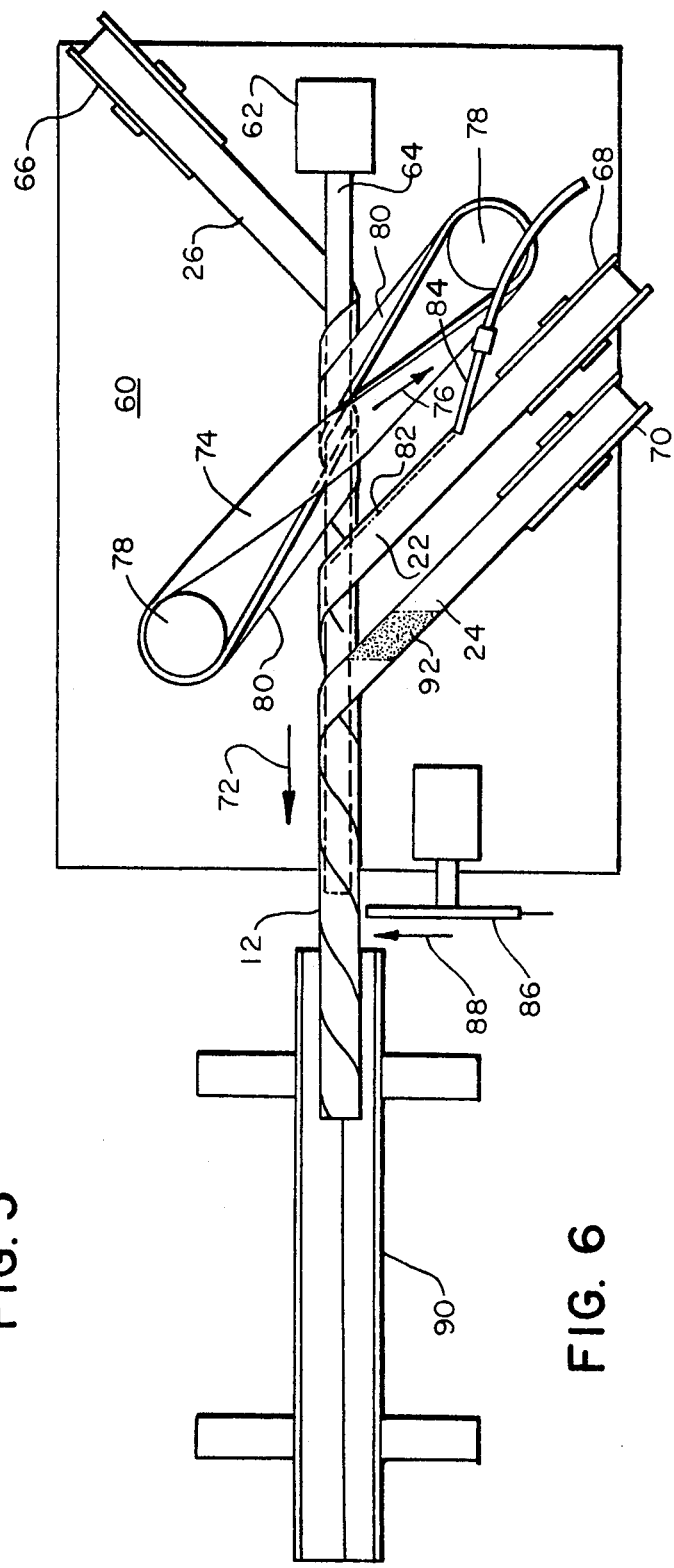
FIG. 6 is a simplified schematic top plan view of apparatus for fabricating the tubular filtration element shown in FIG. 1.

FIG. 6 illustrates a process for manufacturing the laminate tubular filtration element 12. A support platform 60 mounts a chuck-like mandrel holder 62 and a free standing, fixed cylindrical mandrel 64 having a smooth exterior surface. Supply rolls 66, 68 and 70 carry webs of the material forming the layers 20, 22 and 24, respectively. Each of the supply rolls is angled with respect to the mandrel to helically wrap the layers 20, 22 and 24 on the mandrel with each layer self-overlapping and advancing longitudinally along the mandrel in the direction of the arrow 72 at the same speed. The motive force for the wrapping and the advance of the laminate construction is a belt 74 driven in the direction of the arrows 76 by a pair of capstans 78 in a well known manner. A run 80 of the belt is looped closely around the mandrel.

In operation, the material forming the layer 20 is introduced under the looped portion of the run 80 causing it to wrap tightly around the mandrel 64 and advance in the direction of arrow 72. The low coefficient of sliding friction of the web 20 is important in achieving the worm advance of the wrapped web over the mandrel. At a point past the belt run 80, the web 22 of the microporous filtration material is overwrapped on the advancing carrier layer 20. At a point further removed from the belt run 80, the web of the outer layer material 24, if used, is similarly overwrapped on the layer 22. This process is extremely gentle on the fragile microporous filtration material since there is no relative motion between the layers as they are wrapped and the belt 74 never contacts the microporous filtration material. Preferably, the rolls 66, 68 and 70 are spaced along the mandrel 64 so that the regions of overlap 20a, 22a and 24a of each layer 20, 22 and 24 do not themselves overlie one another.

As the web that forms the layer 22 unwinds from the supply roll 68, a fine bead of adhesive 32 is applied along one edge of the web by a nozzle 84. The adhesive bead 82 is positioned on the web within the region of overlap so that it bonds each wrap of the web to the following wrap and forms a continuous cylindrical layer. A similar arrangement (not shown) may be employed with respect to the formation of the inner carrier layer, and, if the outer layer is a lacquer impregnated paper, to the formation of the outer layer. Alternatively, a fine bead of a thermo-plastic adhesive can be applied to the web and sealed by a hot platen located near the mandrel at the point of overlap. Preferably, the adhesive 82 and other materials contacting the fluid comply with the applicable Federal regulations for processing food and drugs. A recommended adhesive material for use in conjunction with the layer 22 is a polymeric lacquer of the type used to make the layer 22 which provides a good seal between the wrap while blocking the passage of bacteria and particulate matter of the size filtered by the layer 22. As the sealed laminate construction 14 advances beyond the end of the mandrel 64, a flying cutting wheel 86 periodically moves in the direction of the arrows 88 to sever the tube into pre-selected lengths. A holder 90 supports the tube 12 as it is being cut. For purposes of illustration only, a typical diameter for the completed tubular filtration element 12 is approximately 1½ inches.

When the outer layer 24 is formed from plastic mesh material, no adhesive bead corresponding to bead 82 is applied since the mesh mechanically locks to itself. A transverse band or strip 92 of acetone or other suitable solvent is periodically applied to the layer 24 over a region that forms the end portions 16 and 18 of each filtration element. Preferably, therefore, the cutting wheel 86 severs the tube at approximately the midpoint of the acetone treated, transverse band.

It will be understood that in the production of the two layer embodiment shown in FIG. 3, the manufacturing process is substantially identical to that described above, except an outer layer 24 is not overwrapped on the layer 22.

Although this invention has been described with respect to a filtration element that cold sterilizes a fluid, this invention also includes the use of a non-sterilizing grade of microporous filtration material. Other modifications will become apparent to those skilled in the art from the foregoing description and accompanying drawings. Such modifications are intended to fall within the scope of the appended claims.

What is claimed is:

1. A fragile tubular filter element having the low resistance to liquid flow characteristic of a microporous membrane, that retains its tubular shape when not under load but requires supportive engagement with a rigid, permeable, downstream support member for hydraulic support when in use, said filter element comprising at least two substantially coextensive layers, an inner layer providing mechanical strength and a next outer layer that consists of a microporous active filtering layer, said layers being formed from separate thin webs of liquid-permeable material and being disposed in mutually engaging relation one nested within the other, the inner layer being highly porous with a bubble point that is or approaches zero and being more permeable to liquid flow than the filtering layer and having sufficient mechanical strength to impart mechanical strength to the entire element, and the microporous filtering layer being a fragile, sterilizable, hydrophilic microporous filtration membrane, and two terminal rings of cured synthetic polymeric material, one at each of the ends of the tubular element respectively, said polymeric material being hydrophilic and impregnating the end portions of the nested layers at each of the ends of the element respectively and uniting these end portions in a 3-dimensional monolithic polymeric ring structure that is reinforced by the impregnated portions of the layers, without substantially affecting the bubble point of the microporous membrane, each of said rings sealing its respective end of the element against lateral leakage when the element is in use, and each imparting mechanical strength to the element.

2. A fragile tubular filter element in accordance with claim 1, wherein each of the layers is formed from a helically wound web, each layer having marginal edges that are disposed in overlapping relation, the confronting surfaces of the overlapped edges of each layer respectively being bonded to each other.

3. A fragile tubular filter element in accordance with claim 1, said filter element comprising a third, outermost layer, all three layers being substantially coextensive, the third, outermost layer being formed from a thin web of liquid-permeable material that permits lateral flow and that is disposed in engaging relation about the microporous membrane, the porosity of the outermost layer being sufficiently great that the bubble point of the microporous membrane is not significantly affected, said terminal rings being formed from cured synthetic polymeric material that impregnates all three of the layers and that unite them and seal the ends of the element against leakage when the element is in use, and that lend mechanical support to the element, said two inner layers being susceptible to wet growth at substantially the same rate, said element being adapted for use in equipment providing an inside to outside liquid flow direction and hydraulic support for the element as affected by wet growth.

4. A fragile filter element in accordance with claim 3, wherein each of the three layers is formed from a helically wound web, each having marginal edges that are disposed in overlapping relation, and the confronting surfaces of the overlapped edges of at least the two-inner layers respectively being bonded together.

5. A fragile filter element in accordance with claim 3, wherein the inner layer is formed from high wet strength paper, and wherein the outermost layer is a finely porous plastic sheet material.

6. A fragile filter element in accordance with claim 3, that is sterilizable and wherein the microporous membrane has uniform pores of 0.22 microns in size or less, to permit the cold sterilization of liquid passing through the filter element.

7. A fragile tubular filter element having the low resistance to liquid flow characteristic of a microporous membrane, that retains its tubular shape when not under load, for use for inside-to-outside liquid flow, that requires supportive engagement within a rigid, liquid-permeable, encasing support member for downstream hydraulic support when in use, said filter element comprising three substantially coextensive layers nested one within the other, said layers being disposed as an inner layer, an intermediate microporous layer, and an outer layer, each layer being formed from a separate, helically wound, thin web of liquid-permeable material, each layer having marginal edges that are disposed in overlapping relation, the confronting surfaces of the overlapped edges of the inner layer and of the intermediate microporous layer respectively being bonded to each other, said inner layer being formed from high wet strength paper that has sufficient rigidity to provide mechanical support for the element and being highly porous with a bubble point that is or approaches zero and being more permeable to liquid flow that the intermediate microporous layer, the intermediate microporous layer being formed from a fragile, sterilizing grade, sterilizable, hydrophilic microporous membrane, the outer layer being formed from a finely porous plastic sheet material that has a low bubble point relative to that of the microporous membrane and that has a structure that permits lateral flow, the porosity of the inner and outermost layers being sufficiently great that the bubble point of the microporous membrane is not significantly affected, and two terminal rings of cured synthetic polymeric material, one at each of the ends of the tubular element respectively, said polymeric material being hydrophilic and impregnating the three layers at each of the ends of the element respectively and uniting them in a 3-dimensional monolithic polymeric ring structure that is reinforced by the impregnated end portions of the layers, without substantially affecting the bubble point of the microporous membrane, each of said rings sealing its respective end of the element against leakage when the element is in use, and each imparting mechanical strength to the element.

8. A fragile filter element in accordance with claim 7 wherein the microporous membrane has a maximum pore size of 0.22 microns, and wherein the outer layer of the element is formed from a non-woven, expanded, high density polyethylene mesh material, and the polymeric material impregnating the end portions of the element is a polyurethane potting compound.

* * * * *